Patented Nov. 9, 1943

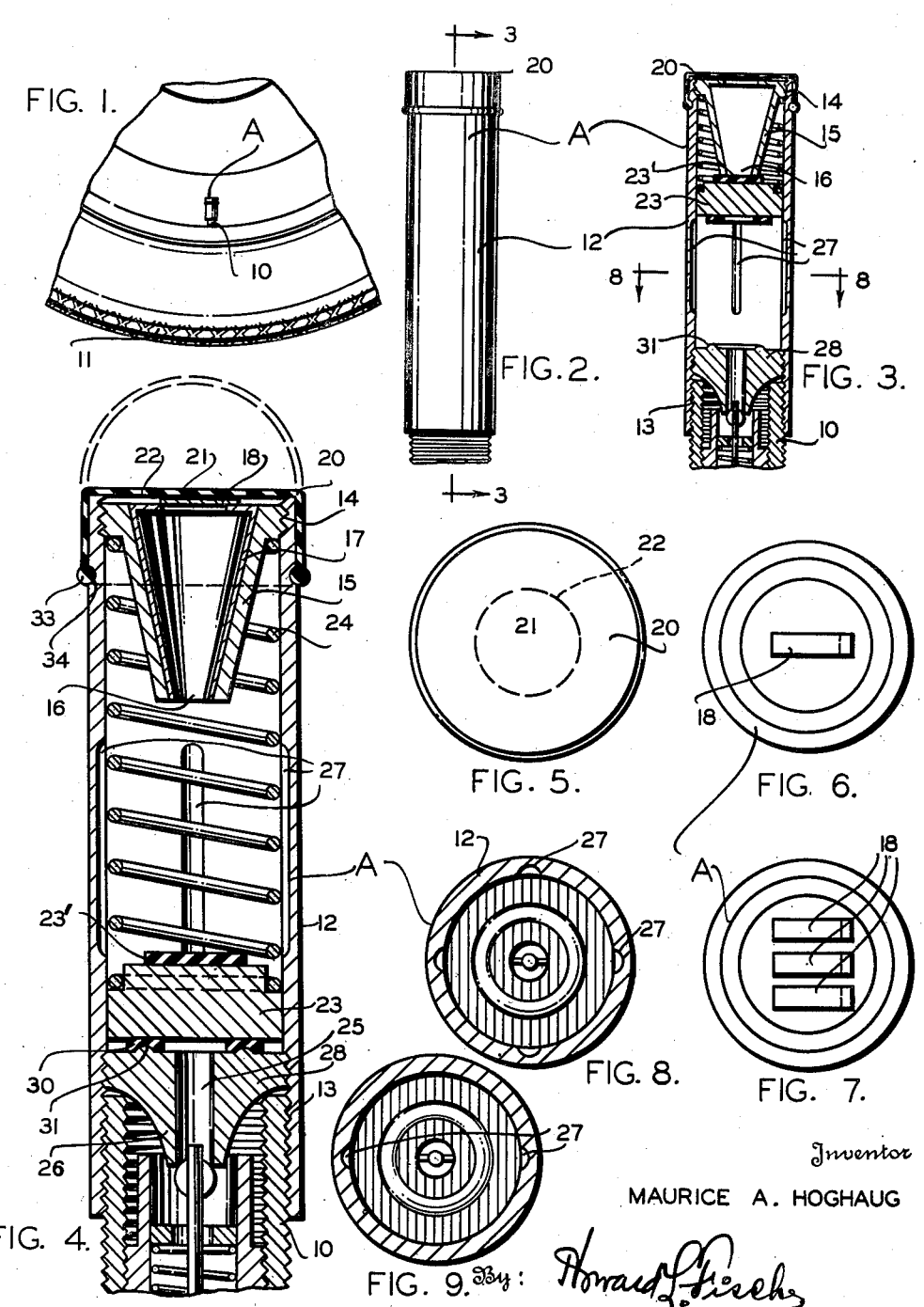

2,334,095

UNITED STATES PATENT OFFICE 2,334,095

SIGNALING DEVICE FOR PNEUMATIC TIRES

Maurice A. Hoghaug, Mahnomen, Minn.

Application April 14, 1941, Serial No. 388,367

2 Claims. (Cl. 116—34)

My invention relates to a pneumatic tire deflation warning device which is adapted to take the place of the cap which ordinarily closes the valve stem of a pneumatic tire.

My warning device is small and compact and may be easily attached to the valve stem, either so that the valve in the stem is depressed to open it, or the same removed and my warning device used as a cap on the valve stem to close the tire.

A feature resides in providing a warning device for pneumatic tires which will give a signal to the operator of the automobile or truck on which the pneumatic tires are used and where the tires are equipped with my warning device, so that the operator may know by the sound of the particular warning device which tire has become deflated to a dangerous point. This I accomplish by having different sounding devices, such as harmonica sounding devices, on the various caps of the different tires.

It is also a feature to provide a warning device which may employ a whistling action to warn the operator of a car that the tire has deflated to a dangerous point.

A further feature of primary importance in my device resides in means for permitting a certain amount of air to escape through the warning device to sound an alarm, and as the tire continues to deflate, by reason of the warning device operating, permitting air to escape through the warning device, the warning device automatically adjusts its valve to shut off the escape of air so that the tire will not become totally deflated.

My warning device may be provided with a rubber cover over the top of the same to keep it free and clean of dirt and dust, which cover is adapted to blow up and explode by air pressure from within the warning device when the air pressure in the tire operates the warning device to sound an alarm.

It is also apparent that the shape of my warning device can be of any desired nature such as octagonal, hexagonal, or any other shape. However, I have found that a cylindrical shape is desirable, as it provides a smooth, neat, compact warning device.

The construction of my warning device is very simple. It is composed of a small number of operating parts, as well as the fixed parts which can be inserted in place in the cylindrical housing very easily, and by simply screwing the warning device onto the threads of the present valve stem of the tire, the same is in place ready to operate to provide a warning means if the tire becomes deflated to a dangerous predetermined point.

These features, together with other details and objects, will be more fully and clearly hereinafter set forth.

In the drawing forming a part of this specification:

Figure 1 is a side elevation of a portion of an automobile wheel showing my warning device attached to the valve stem thereof.

Figure 2 is an enlarged side view of my warning device.

Figure 3 is a longitudinal cross-section on the line 3—3 of Figure 2.

Figure 4 is a cross-section similar to Figure 3, showing the valve in my warning device in such a position so as to shut off the air so that the tire will not become entirely deflated.

Figure 5 is a top view of my warning device.

Figure 6 is a top view of my warning device with the protective rubber cover taken off and showing one harmonica reed.

Figure 7 is a similar plan view to Figure 6, showing three sound reeds in the top of my warning device.

Figure 8 is a cross-section on the line 8—8 of Figure 3, showing the longitudinally extending grooves in the side walls of the casing.

Figure 9 is a similar cross-section to Figure 8, showing only two side wall grooves, rather than four, as are shown in Figure 8.

My pneumatic tire deflation warning device A is illustrated attached to the valve stem 10 of a tire 11, only a portion of which is shown in the drawing in Figure 1.

The warning device A may be made with any outer design, such as cylindrical, as shown in Figure 2 and in the other figures of the drawing, or it may be hexagonal or octagonal, as the case may be, without departing from the principles of the construction which will be hereinafter more clearly defined.

In the drawing I have shown my warning device for pneumatic tires of a cylindrical shape, the body 12 being formed tubular and having internal threads 13 formed therein at the lower end. The upper end is threaded at 14 and is adapted to receive the frustro-conical sound head 15. The inner end of the member 15 is open at 16 to permit air to enter into the hollow sound head 15 in the operation of my warning device A.

Within the sound head 15, I provide a sound supporting element, the body of which is conical in shape and the same being hollow, such as the member 17. The member 17 is adapted to be fixed in the sound head 15 in any suitable manner, and the upper enlarged end is adapted to carry or be formed with a sound reed 18 to provide a harmonic sounding element such as is illustrated in Figure 6. The head 15 may support a sound element 17 which is provided with one or more sound reeds 18, as illustrated in Figure 7, showing three sound reeds 18. The sound head 15 is adapted to be secured by the threads 14 in the cylindrical body 12 of the warning device A.

The warning device A may be provided with a suitable rubber cap 20, which ordinarily closes the head end of the warning device A, to keep dust and dirt out of the same. The center portion 21 of the cap 20 may be formed weakened on the circular line 22, so that the center portion 21 will blow out when the air pressure from inside the sound device passes through the reeds 18. The cap 20 may also be made so that it will be forced off by air pressure from within the safety device A escaping out through the sound head 15.

Within the cylindrical body of the warning device A, I provide a plunger valve 23 which normally presses against the coil spring 24 to compress the same and hold the valve 23 with its rubber gasket 23' against the lower open end 16 of the sound head 15, to close the same by air pressure from within the tire 11 when the tire is properly inflated.

The inner lower end of the warning device A is provided with a hollow tubular member 28 which is threaded into the threads 13 and which is provided with an axial opening 25 for the passage of air through the same. The inner end of the member 28 is formed conical at 26 and is adapted to fit inside of the valve stem 10, so that when the warning device A is threaded to the valve stem 10, the conical end 26 will fit into the valve stem 10 to form an air-tight joint and to permit the air from the tire 11 to pass through the opening 25 and act against the plunger valve 23, forcing the same against the spring 24, to compress the same and close the opening 16 when the tire 11 is up to normal inflation pressure.

The inner wall of the body 12 of the warning device A may be formed with longitudinally extending grooves 27, as illustrated in Figures 4 and 8. The grooves 27 extend for a predetermined distance along the inner surface of the wall of the body 12 and provide air passageways so as to permit air to escape around the valve 23 when the air pressure in the tire 11 drops to a dangerous point below the normal required air pressure for keeping the tire 11 properly inflated.

In operation, the warning device A is attached to the valve stem 10 as illustrated, and the air pressure within the tire 11 forces the plunger valve 23 against the opening 16, closing the valve stem 10 and keeping the air sealed within the tire 11. Should the tire 11 for any reason whatsoever, become deflated to a dangerous point, the spring 24 will overcome the air pressure within the tire and push the valve 23 down into a position in the device A, so that air from the tire may escape through the opening 25 and through the openings 27, around the valve 23, and out through the sound head 15, operating the sound reeds 18 to provide a warning signal to the automobilist advising him that the pressure in the tire 11 has dropped to a dangerous point.

As long as the valve 23 is in the area of the slots 27 so that each end of the slots 27 are open, air will pass out through the opening 16 and operate the noise reeds to provide a harmonica sound. However, as the air pressure in the tire 11 decreases, the valve 23 will drop to the position illustrated in Figure 4, bringing the rubber gasket 30 against the projecting annular rib 31 on the member 28, closing the warning device and preventing the complete deflation of the tire 11.

In Figure 9 I have illustrated only two air passageways 27 extending along the wall of the warning device A.

It will also be apparent, that in place of the reeds 18 the sound supporting element 17 may be provided with a whistle opening in place of these reeds, so that when air escapes through the same it will form a whistling sound. It is also obvious that the sound making device 17 may be of any suitable form or nature.

It will be apparent that my warning device A is compact in nature, composed of only a few parts and simple in construction, so that the same may be easily made, thereby providing a reasonably priced device which may be used in place of the ordinary cap on the valve stem of a pneumatic tire, thereby providing a warning device when the tire becomes deflated to a dangerous point. My device may be made in different sizes for a large or small tire, and is very desirable to provide a means of warning against the deflation of tires to a dangerous point.

Thus it will be apparent that I have provided a very simple inexpensive warning device for pneumatic tires which is adapted to warn the motorist so that he may know when his tires become deflated to a dangerous point. Thus my device, when used on tires as hereinbefore set forth, should save the motorist considerable expense from repairs on tires which would be run without sufficient air in them unless the motorist used my warning device so as to advise him when the tires become deflated.

While other devices have been made heretofore for providing a means of advising the motorist that the tires have become deflated, these devices are complicated and expensive to manufacture, whereas my device is of a simple inexpensive nature and is provided with a sound head 15 which may be replaced or easily set in place to operate, and may be made in different forms and of different characters other than those herein set forth without departing from the spirit and intent of my invention, yet within the scope of the pending claims. Simplicity is of primary importance in my invention.

A further feature of my device is that the amount of air that is allowed to escape before the valve shuts off the escaping air, is limited by the length of the grooves 27 which are provided in the wall of the device. The length of the grooves can be varied, and by making the grooves longer, the length of time that the warning is sounded is lengthened; and by making the grooves shorter, the length of time that the warning is sounded is reduced. In larger vehicles a warning device would be made wherein the length of the grooves would undoubtedly be made longer so as to provide a longer warning. For example, a truck would require a longer warning as the noise of the truck itself makes it difficult to hear outside sounds. The grooves may be V-shaped or semi-circular.

The piston 23 may be lubricated with a graphite or other suitable material so that it will slide freely within the body 12 at all times.

The gaskets 23' and 30 may be of any suitable material, and they are spaced from the inner walls of the body 12 so that they do not contact or rub on the same. Thus the piston 23 is free to operate in either direction in the body 12 and without being retarded by any gasket means contacting the inner surface of the body. In this manner I provide a more desirable operating means than has been accomplished heretofore for providing the proper functioning of the parts at any moment.

The hood 20 is formed with a reinforcing integral annular bead 33 which normally fits in the annular groove 34 formed in the outer wall of the casing 12. Thus the reinforcing bead 33 is adapted to grip in the groove 34 and hold the hood 20 in place on the head of the warning device A. Further, in operation of the warning device A, the hood 20 performs two important functions: one to keep the top of the device A clean from any dirt, and the other to provide a balloon-like warning signal which is adapted to explode when the tire becomes deflated to a dangerous point. As the hood 20 explodes, it will make a sharp explosion noise, warning the motorist, and thereafter the sound device 18 will continue to operate for a long enough period to warn a motorist that his tire or any of his tires have become deflated to a dangerous point.

In this manner I provide a warning device A with a dual function, one of which warns the motorist by an explosive noise, whereas the other warning is sounded for a prolonged period of time.

I claim:

1. A warning device for indicating the deflation of pneumatic tires, including a cap-like member, means for attaching said member to the valve stem of a pneumatic tire, a sound making device in said cap, an air-tight hood member of yieldable material for normally closing said sound making device, a valve within said cap formed and arranged for normally closing said cap to prevent the escape of air therethrough, a series of longitudinally extending grooves in the side walls of said cap, spring means for forcing said valve into open position when the air pressure in the pneumatic tire to which said cap is attached becomes deflated to a dangerous point, said longitudinally extending grooves adapted to by-pass air from the pneumatic tire upon the movement of said valve, whereby said protecting hood is exploded by the air under pressure escaping from said cap and said sound device is operated to provide a warning signal, and said valve adapted to automatically shut off the escape of air through said longitudinally extending grooves upon air pressure decreasing a predetermined amount to prevent the tire from being entirely deflated.

2. A warning signal for pneumatic tires adapted to indicate deflation of the same, including a tubular casing adapted to be attached to the valve stem of a tire, a sound head carrying a sound producing member in one end of said tubular casing, a flange extending around said sound head, wall portions extending inwardly and downwardly from said flange, said wall portions adapted to form a valve seat, a pair of longitudinally extending grooves in the walls of said tubular casing, a piston in said tubular casing, a spring positioned between said flange and said piston, said piston normally closing said sound head by engaging said valve seat, and said piston in said casing moving downwardly when the air pressure in said casing is decreased, said piston allowing air to by-pass through said longitudinally extending grooves to operate said sound producing member in said sound head, and said spring adapted to move said piston past said grooves thereby shutting off the escaping air through said grooves before the tire becomes further deflated.

MAURICE A. HOGHAUG.